Sept. 23, 1958 F. BOWMAN 2,852,790
APPARATUS FOR REMOVING PASTE FROM FRAMED PLATES
Filed May 25, 1950 2 Sheets-Sheet 1
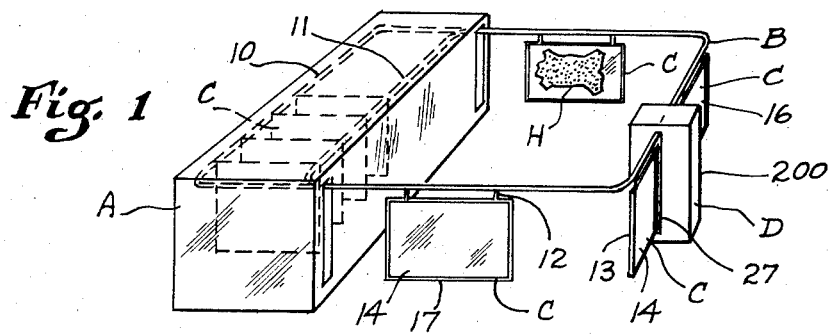
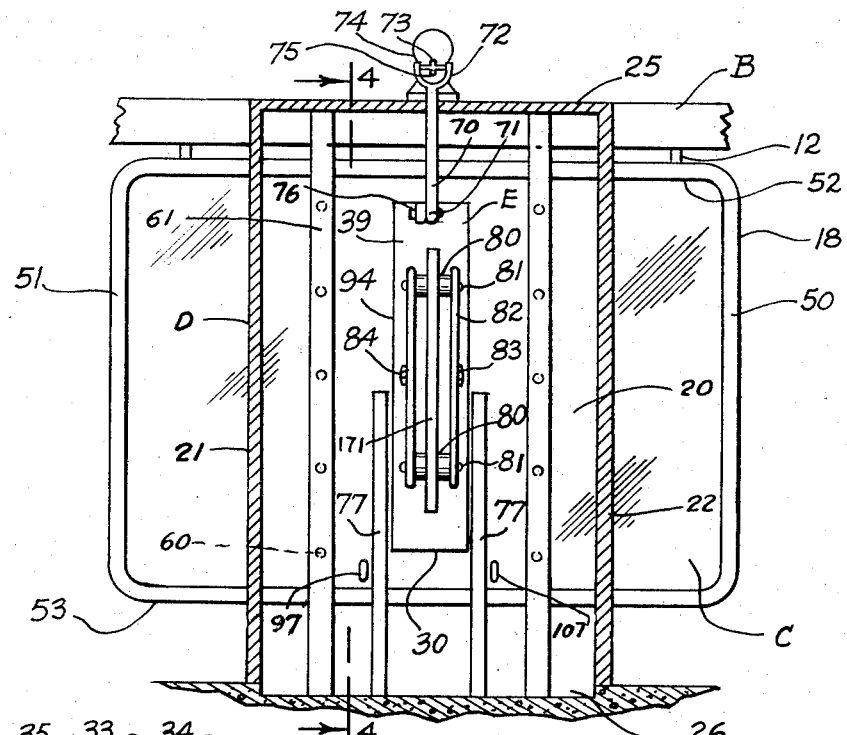
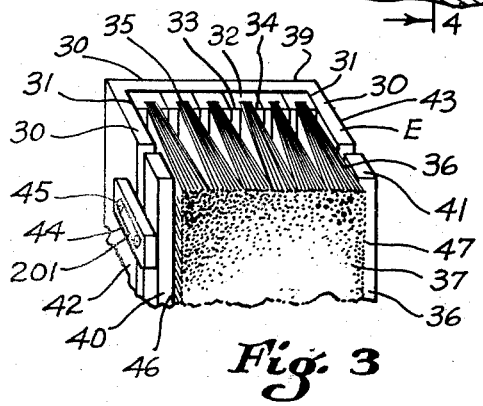
INVENTOR.
FRANCIS BOWMAN
BY Pearson + Pearson
attorneys Sept. 23, 1958      F. BOWMAN      2,852,790
APPARATUS FOR REMOVING PASTE FROM FRAMED PLATES
Filed May 25, 1950      2 Sheets-Sheet 2
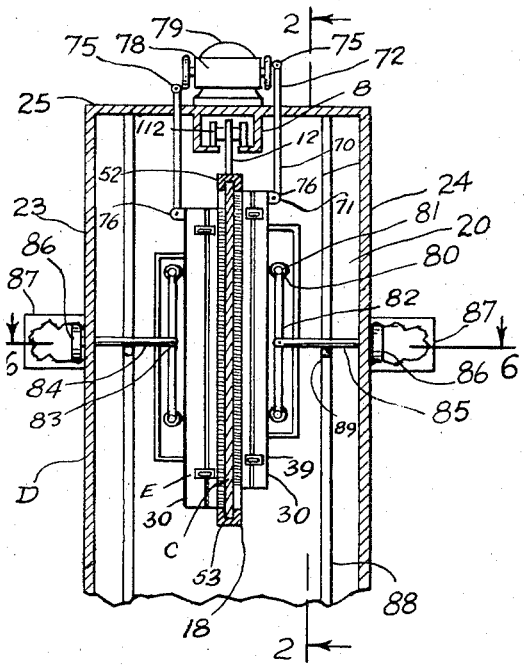
Fig. 4
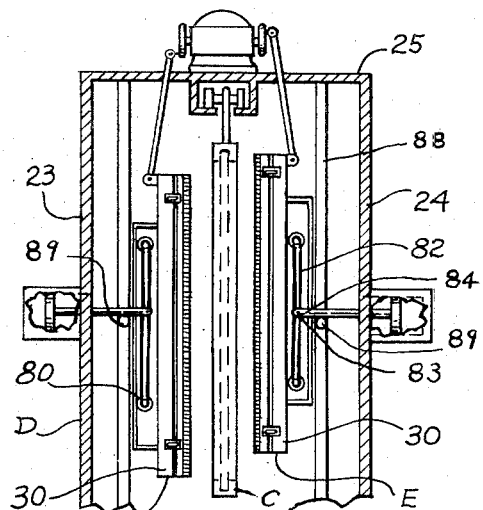
Fig. 5
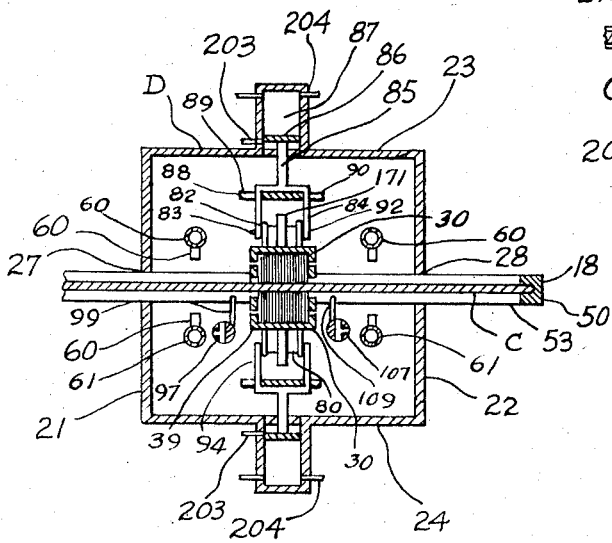
Fig. 6
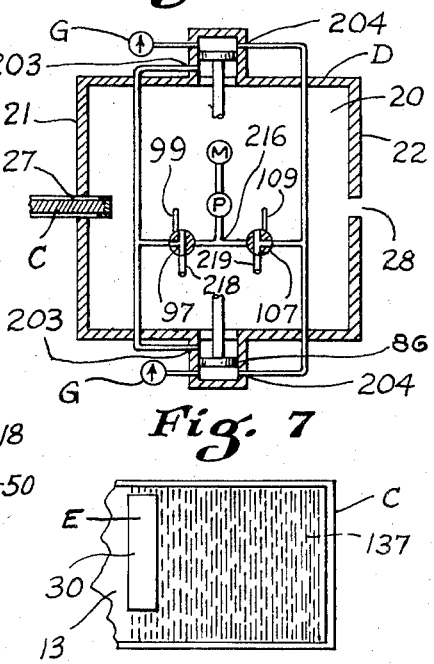
Fig. 7
Fig. 8
INVENTOR.
FRANCIS BOWMAN
BY Pearson + Pearson
attorneys

United States Patent Office 2,852,790
Patented Sept. 23, 1958

2,852,790

APPARATUS FOR REMOVING PASTE FROM FRAMED PLATES

Francis Bowman, Nashua, N. H.

Application May 25, 1950, Serial No. 164,177

2 Claims. (Cl. 15—77)

This invention relates to a machine for cleaning paste from either or both sides of a pasting plate used in tanneries.

Such plates are usually of glass, enamel, or the like, and are large enough to permit an entire animal hide to be pasted to each side. A marginal frame is provided, of wider cross section than the body of the plate for the support thereof and suitable trolleys are attached by hangers to the upper marginal frame strip. An endless track conveys the plates, by means of the trolley, past a setting station where a hide is pasted on each side, then through a drying oven, then past a stripping station where the hide is removed, and then through a cleaning chamber where the paste is removed. At the setting station another hide is pasted on each vertical surface of the plate.

Heretofore the paste has been removed from each side of the plate in an enclosed chamber containing oppositely disposed sprays of water or other liquid and containing oppositely disposed revolving brushes. The revolving brushes have been made of comparatively long bristles, for example of "bassine" fibre, so mounted as to be capable of yielding and bending sufficiently to permit the forward and rear edge of a plate frame to pass between the brushes. It has been found that such bristles are so bendable or that the tufts thereof have so little support that the paste is not cleaned from the plate. It has further been found that when the path of the bristles is circular, the paste is simply stirred in a circular path without being completely cleaned from the plate.

The object of my device is to provide a cleaning device, equipped with liquid sprays and tracks as in prior devices, but having an improved scrubbing member which reciprocates rather than revolves and which can be advanced and retracted with relation to the plate surface. A further object of my device is to provide means for applying a predetermined amount of pressure upon the scrubbing member so that the amount of friction used in scrubbing and cleaning may be accurately controlled and steadily maintained.

My device improves over prior devices in that my scrubbing member is composed of bristles which do not bend easily or which, if bendable, are so supported as to prevent bending. I prefer to use bristles of fine metal wire so tightly packed that the scrubbing surface presents a profusion of mutually supporting sharp points. The sharp points cut into the paste and remove it very effectively but there are so many points that they ride on the surface of the plate itself without scratching the same. My scrubbing members are mounted to reciprocate rapidly up and down in a straight line, rather than in a curved path, and therefore tend to urge the paste to the top and bottom of the plate where it can be washed away by the sprays. Since the bristles of my scrubbing member are substantially stiff and are too non-yielding to permit passage of the plate frame, the scrubbing member itself may be advanced and retracted automatically by fluid operated means when the plate frame passes through and when pressure is desired. The bristles of my scrubbing member are preferably of Phosphor bronze or the like, but I may also use hog bristles, nylon, tampico or other fibrous root bristles, provided they are either inherently stiff or are suitably supported against yielding or bending, in the manner disclosed herein.

The fluid operated means of my device is preferably a cylinder having a piston operated by a vapor such as compressed air, but the piston may be operated by a liquid such as oil.

In the drawings, Fig. 1 is a perspective view of a hide drying apparatus as now used but with my new cleaning device in position.

Fig. 2 is a side elevation, partly in section, on line 2—2 of Fig. 4 of my new cleaning device.

Fig. 3 is a fragmentary isomeric view showing the preferred form of my new scrubbing member.

Fig. 4 is a front elevation, partly in section, of the device shown in Fig. 2 on line 4—4 of Fig. 2.

Fig. 5 is a view similar to Fig. 4, but showing my scrubbing members in the retracted position just after a plate has passed through.

Fig. 6 is a plan view in section on line 6—6 of Fig. 4 of the device as shown in Fig. 2 and Fig. 4.

Fig. 7 is a diagrammatic view, similar to Fig. 6, showing the fluid operated control of my new scrubbing member.

Fig. 8 is a view showing the path of one or more bristles of my new scrubbing member as they reciprocate vertically on the side of a horizontally moving plate.

As shown in Fig. 1, A is a drier of a well known type having parallel overhead tracks 10 and 11 which are part of an endless track system B. A number of plates C, supported by hangers 12, from trolleys 112, are either manually or automatically moved around the track system B. The plates are in closely spaced parallel relationship, as they pass through drier A, and the hides H, pasted on either or both sides 13 and 14 of a plate C are subject to the drying means in drier A.

A setting station is provided at 16 where liquid paste is applied and a hide H fixed to sides 13 and 14 of C and a stripping station is provided at 17 where the dried hides H are removed after passing through drier A.

A plate cleaning station 200 is located after stripping station 17 and before setting station 16 where the dried paste must be removed from the stripped plates C. Plate cleaning has formerly been accomplished either by an operative equipped with a hand brush and pail of water or by one of several types of automatic cleaning chambers which include water sprays and revolving brushes.

As shown in Fig. 1, my new cleaning device D is located at 200 and is designed to remove the dried paste automatically and more effectively than prior cleaning devices. It is especially useful with the plates now in general use in the industry which are constructed with a marginal reinforcement in the form of a frame 18 having a forward edge 50, a rear edge 51, an upper edge 52 and a lower edge 53. Frame 18 increases the resistance to distortion of the plate C caused by changes in temperature, or to other stresses and strains such as contraction of the hide H during the setting, drying or stripping process.

My new cleaning device D comprises an enclosed chamber 20, having a forward wall 21, a rear wall 22, side walls 23, 24, and a top 25, the chamber being mounted over a suitable trough 26 for carrying off waste water. Track B passes through the center of chamber 20 and a slot 27 in wall 21 and slot 28 in wall 22 are provided to permit a plate C with its frame 18 to pass through.

The scrubbing member E of my device comprises a rigid channelled backing member 30, of metal, elongated so that it is nearly as long as the distance between edges 52 and 53 of a plate C. At the base 31 of the channelled portion of backing member 30, I insert one or more channelled strips of contractile metal 32 having side walls 33 and 34 which tend to spring inwardly toward each other, the strips being held within base 31 by welds, bolts, or any suitable manner. In the channelled portion 35 of strips 32 are inserted tufts made up of bristles 36 preferably of very fine metal wire, the walls 33 and 34 of each strip grasping and holding the base of the tufts due to their inherent contractibility. Bristles 36 are preferably about four inches long and are tightly packed together to present a scrubbing or cleaning surface 37 made up of many sharp points with minute spaces between the points. I provide elongated bars 40, 41 in extension of walls 42, 43, of member 30, the bars being removably affixed thereon by a strap 44 and bolts 45, to prevent the bristles 36 from yielding or bending. The forward edges 46 and 47 of bars 40 and 41 are preferably about one-quarter of an inch from the scrubbing surface 37 and thus give support thereto as well as holding the bristles 36 in a closely packed mass.

As the scrubbing surface 37 wears down, a new bar 40 and 41 may be substituted, of less width, to maintain the proper supporting relationship between bar and bristles and the amount of pressure applied by the bars on the mass of bristles may be adjusted by tightening or loosening bolts 45. A slot such as 201 may be provided in a strap such as 44 so that a bolt 45 may adjustably hold the bar in the desired relation to surface 37.

Sprays 60, 60 are provided within chamber 20, on vertical pipes 61, 61 to wet the surface of plates C before and after the plates pass between the oppositely disposed pair of scrubbing members E, E.

The straight line reciprocation of my scrubbing members E is obtained by suspending each at 76 from the lower end 71 of a hanger 70, the upper end 72 of the hanger being connected to a crank arm or, as shown at 75, to a pin 73 near the circumference of a pulley wheel 74. A universal joint of any suitable type may be used at 75 and/or 76 to permit the scrubbing member to travel vertically in a straight line and to be advanced or retracted in a horizontal plane while parallel to plate C. Guide tracks 77 are provided, as shown in Fig. 2, to direct scrubbing member 30 in a straight line path while it is being reciprocated up and down.

Reduction gears 78 are connected to pulleys 74 and are powered by an electric motor 79 so that the scrubbing members E will reciprocate between one hundred and two hundred times per minute or even more, while a plate C completes its travel through chamber 20 in a period of about a minute. The pulley wheels 74 and pins 73 are preferably so set that one scrubbing member E is moving upward while the opposite scrubbing member E of the pair is moving downward and vice versa.

The rear 39 of backing member 30 of scrubbing member E is smooth and in contact with the rear 39 are rollers 80, revoluble on pins 81 mounted between two parallel supports 82 so that the rollers can press the scrubbing member 30 against plate C while the scrubbing member 30 reciprocates up and down. I may use an upper, central and lower roller for each member 30 or any desired number of such rollers.

The parallel supports 82, for rollers 80, are connected by a pin 83 to the tips of the bifurcated end 84 of a piston 85. The supports 82 can thus pivot slightly on pin 83, as shown in Fig. 5, when the scrubbing members E are retracted. Piston 85 has a piston head 86 at its other end operating in a fluid operated cylinder 87 supported on the walls 23 and 24 of D.

To support the piston 85, bars 82 and the rollers 80, I may use a hanger pivotally suspended from the top 25 or as shown in the drawings, I may use a vertical post 88 having horizontally extending arms 89 and 90 upon which the forks 92, 92, at the piston end 84 are slidably supported.

In order that members E may be retracted when the piston 85 is retracted, I provide a U-shaped bar 171 fixed at each end to the back 39 of scrubbing member 30 and passing around the rollers 80.

The post 88 may be used as a stop for the bifurcated end 84 of piston 85, as shown in Fig. 6, thus preventing the member E from advancing too far or any suitable stop may be provided in a well known manner.

Each cylinder 87 of my device may be operated by a suitable fluid and is of the two way type having a fluid port at 203 to retract piston head 86 and another fluid port 204 to advance piston head 86 as indicated in Fig. 7. A contact arm 99 of valve 97 is located in front of the pair of members E in a position to be actuated by the forward edge 50 of a plate C, and to cause fluid to be admitted to fluid ports 203 and ejected from fluid ports 204 of the oppositely disposed cylinders 87, thus retracting the members E for the entrance of plate C.

A similar contact arm 109 of valve 107 is located just beyond the members E in cleaning device D in a position to be actuated by the forward edge 50 of plate C and to cause fluid to be admitted to fluid ports 204 and ejected from fluid ports 203 of cylinders 87, thus advancing the members E for cleaning the sides 13 and 14 of C.

The rear or trailing edge of plate C at 51 also actuates the arm 99 to retract the scrubbing members E so that the edge 51 may pass between the surfaces 37 of scrubbing member E and arm 109 may be actuated by the edge 51 to again advance the members E after the entire frame has travelled beyond the members E.

Contact arms 99 and 109 may be connected to electric switches adapted to open and close ports 203 and 204 or as shown in Fig. 7, they may be connected to fluid valves in the lines leading to such ports. Any suitable method of operating the cylinders 87, may be used, however, of the many types well known in the art. Similarly the amount of fluid pressure exerted on piston head 86 in cylinder 87 may be controlled in any well known manner as desired.

In Fig. 7, I show diagrammatically the two way valve 97 arranged to place ports 203 in communication with a pressure pipe 216 or to open the cylinder to a waste pipe 218. Two way valve 107 is also arranged to place ports 204 in communication with pressure pipe 216 or to open the cylinder to a waste pipe 219. A pressure regulating valve P, fluid pump M and pressure gauges G on each cylinder are also shown to illustrate the manner in which the scrubbing pressure of my scrubbing members E may be controlled.

In Fig. 8, I have shown the cleaning action of my reciprocating member E by illustrating the path 137 of its brushing surface 37 as it travels up and down the sides 13 or 14 of a plate C. If the plate C is travelling at a speed which will pass it between the members E in about a minute, I have found that about 200 reciprocations of the members E completely removes the dried paste. With this rate of reciprocation it is obvious that the path of a particular tuft or bristle will either be superimposed on a previous path or be so close to the same as to be impossible to illustrate accurately. Since there is a comparatively wide surface 37 on member E, with a plurality of adjacent tufts, a particular spot on the plate C is repeatedly contacted by succeeding tufts and bristles until thoroughly cleaned.

The essence of my invention is a pair of cleaning members having substantially stiff bristles, preferably arranged to reciprocate vertically in a straight line on opposite sides of a horizontally moving plate, arranged to be retracted for the passage of the plate frame and to be advanced under controlled fluid pressure for cleaning the sides of the moving plate.

I have described the novel features of my invention in some detail, but obviously many other embodiments will readily occur to those skilled in the art. I therefore do not limit myself to the precise details shown and described, but claim as my invention all embodiments, variations, and modifications coming within the scope of the subjoined claims.

I claim:

1. A plate cleaning machine of the character described, comprising an enclosed chamber with aligned elongated slots in two opposite end walls for the edgewise passage of plates therethrough; plate spray means within the chamber, adapted to wet a flat side surface of a plate; plate scrubbing means within the chamber comprising a scrubbing member with tightly packed unbendable tufts of substantially stiff bristles in contact with the wet side surface of said plate; means including vertical guide tracks for reciprocating said scrubbing member only in a straight line along a path transverse to the direction of travel of said plate; and automatically operated means including freely revolvable rollers in slidable engagement with said scrubbing member adapted to control the contact pressure between the scrubbing member and said plate.

2. A machine for individually and successively cleaning dried paste from the opposite, flat, side surfaces of a plurality of upstanding, framed, hide plates while said plates are advancing end to end around a closed horizontal path, said machine comprising an enclosed cleaning chamber with aligned vertically extending slots in each opposite end wall thereof for the passage of said plates therethrough; plate spray means on each opposite side wall of said chamber, arranged to continually wet the opposite flat side surfaces of a plate passing through said chamber; a pair of stiff brushes each having a substantially unbendable mass of close packed bristles and each positioned on an opposite side of said chamber to engage the opposite flat side surfaces of a plate passing through said chamber; automatic retracting means, actuated by the passage of a plate through said chamber, for retracting said stiff brushes out of the path of the upstanding frame strips of a plate while said frame strips pass between said pair of stiff brushes; automatic pressure means, operably connected with said retracting means, for controlling the pressure with which said stiff brushes engage the flat side surfaces of a plate passing through said chamber, said retracting means and said pressure means including a pair of oppositely disposed pistons and cylinders adapted to move said brushes in a horizontal plane perpendicular to the side surfaces of said plates, and automatic scrubbing means including a pair of universally jointed crank arms, for reciprocating each brush, only in a rectilinear path parallel to the rectilinear path of the other brush of the pair, over a portion of one of the opposite, flat side surfaces of the plate engaged thereby.

References Cited in the file of this patent

UNITED STATES PATENTS

| | | |
|---|---|---|
| 477,703 | Roth | June 28, 1892 |
| 815,460 | McCoy | Mar. 20, 1906 |
| 1,680,197 | Bateman | Aug. 7, 1928 |
| 1,823,222 | Whitsitt | Sept. 15, 1931 |
| 1,903,520 | Sturgis | Apr. 11, 1933 |
| 1,982,356 | Rutter | Nov. 27, 1934 |
| 2,279,691 | Long et al. | Apr. 14, 1942 |
| 2,283,293 | Steiert | May 19, 1942 |
| 2,291,553 | Mathy | July 28, 1942 |
| 2,343,532 | Buckley | Mar. 7, 1944 |
| 2,439,305 | Johnson | Apr. 6, 1948 |
| 2,491,401 | Tucker et al. | Dec. 13, 1949 |

FOREIGN PATENTS

| | | |
|---|---|---|
| 25,513 | Great Britain | of 1902 |